United States Patent

Kohama et al.

[11] 3,975,951
[45] Aug. 24, 1976

[54] INTAKE-AIR AMOUNT DETECTING SYSTEM FOR AN INTERNAL COMBUSTION ENGINE

[75] Inventors: Tokio Kohama, Nishio; Hideki Obayashi, Aichi; Tadashi Hattori, Nishio; Minoru Nishida, Okazaki, all of Japan

[73] Assignee: Nippon Soken, Inc., Nishio, Japan

[22] Filed: Mar. 20, 1975

[21] Appl. No.: 560,171

[30] Foreign Application Priority Data
Mar. 21, 1974 Japan.............................. 49-32384
May 13, 1974 Japan.............................. 49-53624
May 13, 1974 Japan.............................. 49-53625
May 13, 1974 Japan.............................. 49-53626
Nov. 15, 1974 Japan.............................. 49-132171

[52] U.S. Cl................................ 73/116; 73/204; 123/32 EA
[51] Int. Cl.² ....................................... G01M 15/00
[58] Field of Search........... 73/204, 116; 123/32 EA

[56] References Cited
UNITED STATES PATENTS

| 1,260,498 | 3/1918 | Wilson | 73/204 |
| 2,994,222 | 8/1961 | Laub | 73/204 |
| 3,747,577 | 7/1973 | Mauch et al. | 123/32 EA |
| 3,824,966 | 7/1974 | Schneider et al. | 123/32 EA |

Primary Examiner—Jerry W. Myracle
Attorney, Agent, or Firm—Cushman, Darby & Cushman

[57] ABSTRACT

There is provided an intake-air amount detecting system for an internal combustion engine in which a first temperature of an intake air for an internal combustion engine is measured, the intake-air is heated by an electrical heating element, a second temperature of the heated intake-air is measured, an amount of heat generated by the electrical heating element is adjusted to maintain a difference between the second temperature and the first temperature at a fixed value, and the amount of heat generated by the heating element is calculated to determine the amount of the intake-air to the internal combustion engine.

8 Claims, 20 Drawing Figures

INTAKE-AIR AMOUNT DETECTING SYSTEM FOR AN INTERNAL COMBUSTION ENGINE

BACKGROUND OF THE INVENTION

Field of the Invention

The present invention relates, in general, to an intake-air amount detecting system for an internal combustion engine which detects the amount of the intake-air for the internal combustion engine provided with an electronically controlled fuel injection device.

By maintaining an air-to-fuel ratio of gas mixture supplied to the internal combustion engine to a theoretical air-to-fuel ratio which permits an optimum performance of the engine, not only the operational performance of the engine is enhanced but also the cleaning ability of an engine exhaust gas cleaning device, particularly a catalyst type exhaust gas cleaning device, is optimized. For this reason, it is necessary to accurately detect the amount of the intake-air by weight to the engine to supply an amount of fuel to the engine, which amount depends on the amount of the intake-air. In the past, in the detection device of this type, the volumetric amount of the intake-air has been detected indirectly from the r.p.m. of the engine and the intake negative pressure or from the r.p.m. of the engine and the aperture of a throttle valve. As a result, due to manufacturing tolerance of the engine, deterioration of engine performance, misadjustment of clearances for intake valve and exhaust valve, and variation in time of the performance of an air cleaner, large errors have been included in the measured amount. In addition, since the amount measured was in a volumetric flow rate, a complex apparatus has been required, resulting in increase of cost.

Another prior art device is the so-called heat wire anemometer disclosed in the U.S. Pat. No. 3,747,577, which is shown in FIG. 1. There is provided in an intake tube a temperature dependent resistor 18, which, together with other three resistors 19, 20, and 21, constitute a bridge circuit so that the resistor 18 is kept at a constant temperature and hence the resistance value of the resistor 18 is kept at a constant value. The resistor 18 is cooled by the intake-air. As the flow rate of the intake-air increases, the resistor 18 is considerably cooled. In order to maintain the balance in the bridge circuit, the amount of current flowing through the resistor 18 is increased to increase the amount of heat generation by the resistor 18. When the flow rate of the intake-air decreases, the current through the resistor 18 is reduced to reduce the heat generation by the resistor 18 in order to maintain the balance in the bridge circuit. The flow rate of the intake-air can be determined by detecting the amount of current through the resistor 18. In this case, however, if the temperature of the intake-air per se changes, the relation between the flow rate of the intake-air and the current is also changed. To avoid such inconvenience, the U.S. Pat. No. 3,747,577 uses a temperature measuring resistor 30 instead of the resistor 20 in the bridge circuit, as shown in FIG. 2, to measure the temperature of the intake-air for necessary compensation. In this system, the air flow rate is given by the following formula;

$$R \cdot i^2 = (a + b \sqrt{U})(T - T_0)$$

where $R$ is a resistance value of the resistor 18, $i$ is an amount of current through the resistor 18, $a$ and $b$ are constants, $U$ is a flow rate of the intake-air, $T$ is a surface temperature of the resistor 18 and $T_0$ is a temperature of the intake-air. As seen from the above formula, since the air flow rate $U$ is calculated as a four order function of the current $i$, i.e. $F(i^4)$, it is necessary that the current $i$ should be accurately detected. Furthermore, although the amount of the intake-air is calculated from the air flow rate in the prior art system, it is the amount of air measured directly in the flow rate by weight, as described above, that is required in the fuel injection device which uses the intake-air amount detection device of the above type.

SUMMARY OF THE INVENTION

The present invention is intended to overcome the above difficulties encountered in the prior art and it is characterized by the provision of a first temperature detecting means arranged in an intake path of an internal combustion engine for detecting a temperature of an intake-air to said engine; an electrical heating means arranged in said intake path for heating said intake-air; a second temperature detecting means arranged in said intake path for detecting a temperature of the intake-air having been heated by said electrical heating means; said first temperature detecting means, said electrical heating means and said second temperature detecting means being arranged in this order along the direction of flow of said intake-air; a tubular path means including a heat insulating material disposed to cover said first and second temperature detecting means and said electrical heating means; a heat amount control circuit means connected to said first and second temperature detecting means and said electrical heating means for controlling the amount of heat generated by said electrical heating means so as to continuously maintain a predetermined difference between the temperature of the heated intake-air and the non-heated intake-air; and an operational circuit means for calculating the amount of heat generated by said electrical heating means to determine the amount of intake-air to said engine.

More particularly, assuming that Q is an amount of heat generation by the heating element, G is an amount by weight of the intake-air and $\Delta T$ is a difference in temperature of the temperature dependent resistors constituting the first and second temperature detecting means, the Q is expressed by;

$$Q = a \cdot R \cdot i^2 = G \cdot \phi \cdot \Delta T$$

where $R$ is a resistance value of the first temperature dependent resistor, $i$ is a magnitude of current passing through the first resistor, $\phi$ is the specific heat of air at a constant pressure, which is substantially constant, and $a$ is a constant. As seen from the above formula, the amount of the intake-air by weight $G$ can be determined by measuring the amount of heat $Q$. The amount of the intake-air by weight $G$ can be determined as a two-order function of $i$, i.e., $F(i^2)$.

With the arrangement of the present invention, since both of the temperature dependent resistors are equally influenced by the flow rate of the intake-air or cooling thereby, it is possible to measure by the temperature dependent resistors only the amount of temperature elevation of the intake-air caused by the heating means. As a result, it has become possible to determine the amount of the intake-air directly in the flow rate by weight. This brings about a material advantage in that the influence of the manufacturing tolerances of the engine and the deterioration of the performance of the engine can be avoided and the necessity of compensation for the temperature and pressure of the intake-air is eliminated.

DESCRIPTION OF THE PREFERRED EMBODIMENTS

Figure 1:
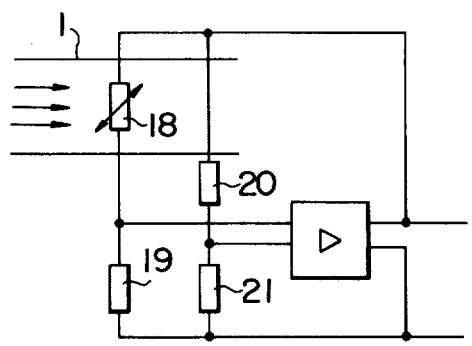
FIGS. 1 and 2 show configurations of prior art devices.
Figure 2:
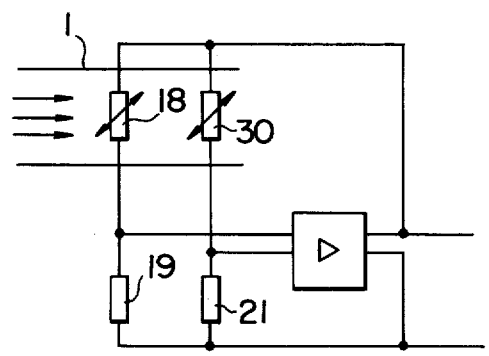
Figure 3:
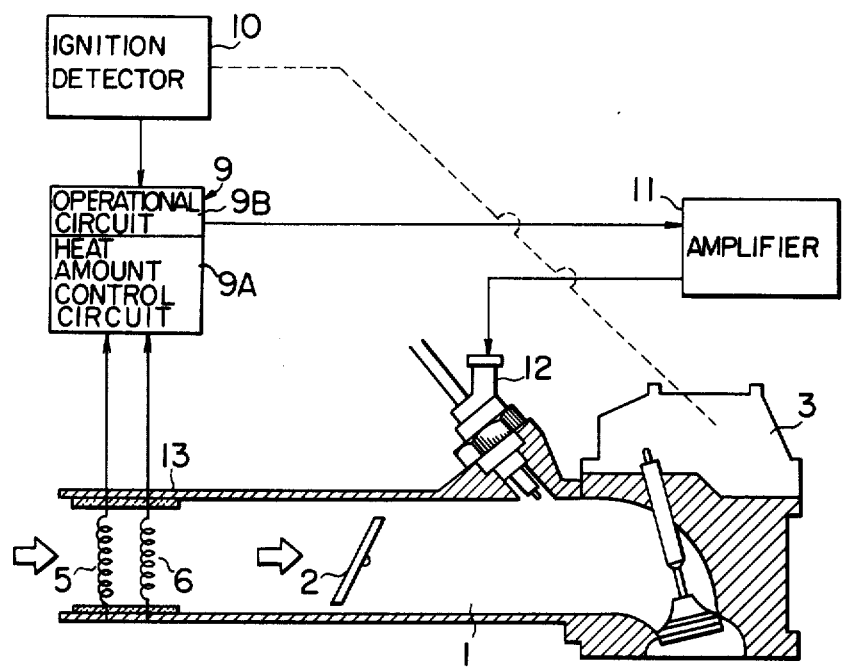
FIG. 3 shows a configuration of a first embodiment in accordance with the present invention.
Figure 4:
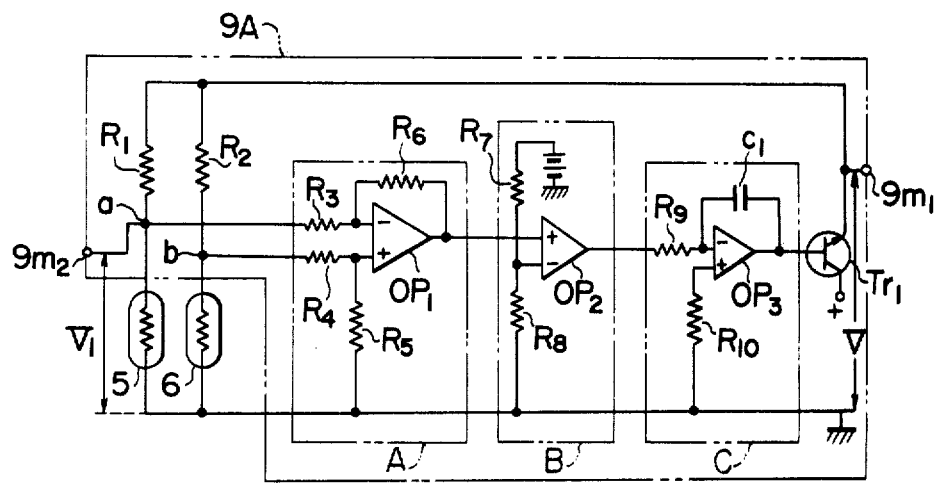
FIG. 4 shows an electrical circuit diagram of a heat amount control circuit shown in FIG. 3.
Figure 5:
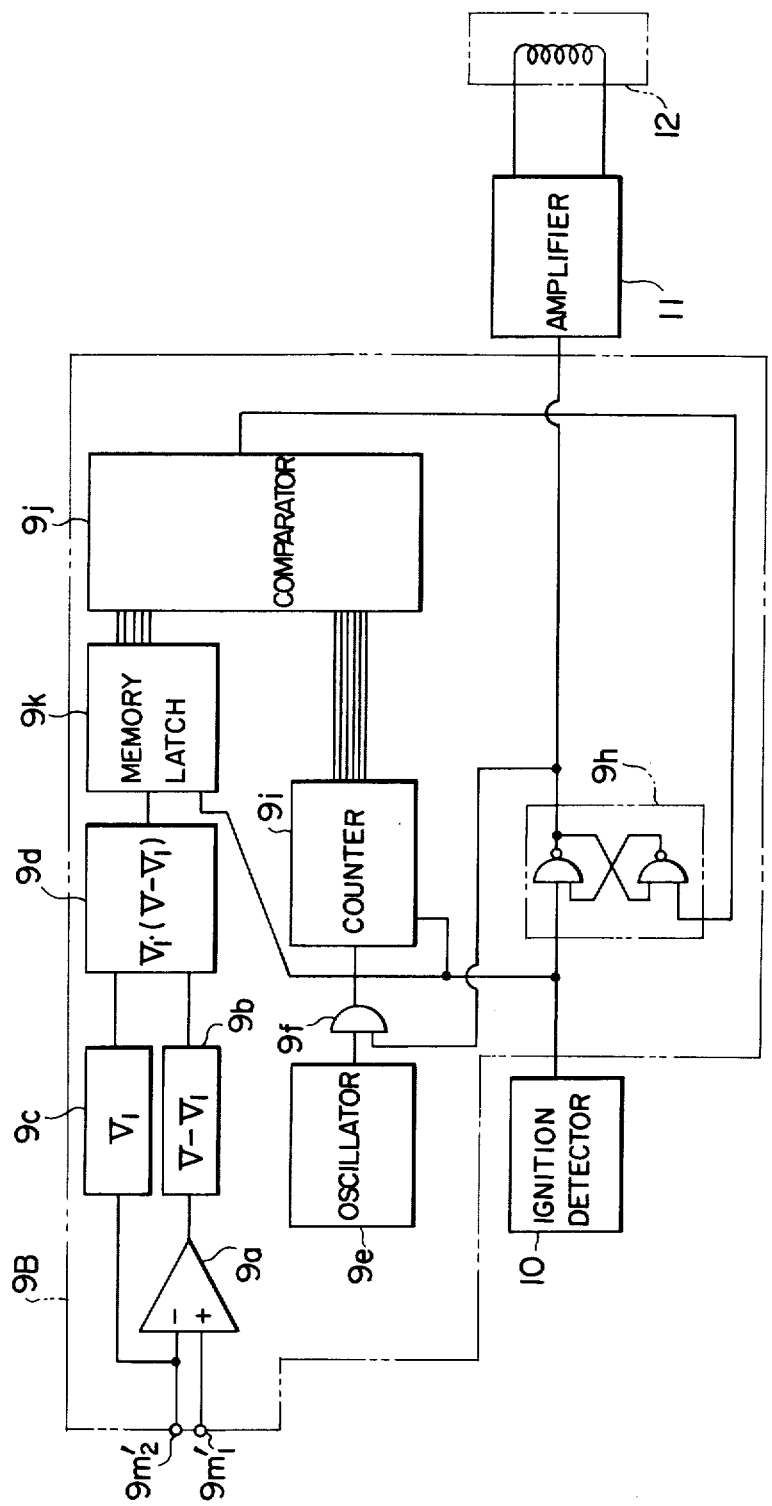
FIG. 5 is a block diagram of a control circuit shown in FIG. 3.
Figure 6:
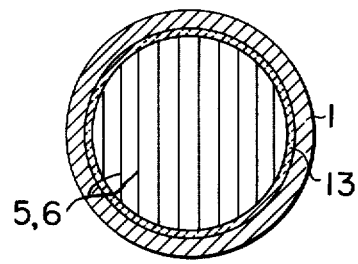
FIG. 6 is a cross-sectional view of a portion of an intake tube, shown in FIG. 3, where first and second temperature dependent resistors are mounted.

The present invention will now be described in connection with the first embodiment thereof shown in FIGS. 3 to 6. Referring to FIG. 3, numeral 1 designates an intake pipe of an internal combustion engine 3, 2 designates a throttle valve mounted on the intake pipe 1, 5 designates a first temperature dependent resistor which is mounted in the intake pipe 1 and serves as both a thermometer and a heater, and 6 designates a second temperature dependent resistor which is mounted downstream of, and adjacent to the first temperature dependent resistor 5 and which serves as a thermometer. Both of the temperature dependent resistors 5 and 6 have the same resistor-temperature characteristic. In this embodiment, the temperature dependent resistors consist of platinum resistor wires which spread in a grid pattern across an entire cross section of the pipe, as shown in FIG. 6. 13 designates a tubular heat insulating layer made of a heat insulating material such as glass wool arranged within the tubular wall of the intake pipe 1. It covers the temperature dependent resistors 5 and 6 to prevent the heat generated by the first temperature dependent resistor 5 from dissipating to the intake pipe 1. 9 designates a control unit which includes a heat amount control circuit 9A for controlling the amount of heat generated by the upstream first temperature dependent resistor 5 so as to maintain a constant temperature difference and hence a constant resistance difference between the first and second temperature dependent resistors, and an operational circuit 9B for calculating the amount of heat generated by said first temperature dependent resistor 5, calculating therefrom the amount of the intake-air and controlling the time duration during which an injection valve 12 which injects fuel to the engine 3 is opened. 10 is a conventional ignition detector which generates output pulses in synchronism with the rotation of the engine 3, and 11 designates an amplifier which amplifies an output signal from the control unit 9. 12 designates an electromagnetic injection valve which is mounted on the intake pipe 1 and opened in response to a signal from the amplifier 11 to feed fuel to the engine 3. The control unit 9 may include electrical circuits as shown in FIGS. 4 and 5. FIG. 4 shows the heat amount control circuit 9A consisting of differential amplifiers in which currents flow through the temperature dependent resistors 5 and 6 via reference divider resistors $R_1$ and $R_2$, respectively. A designates a differential amplifier which comprises input resistors $R_3$ and $R_4$, a resistor $R_5$, a feedback resistor $R_6$ and an operational amplifier $OP_1$ and which amplifies the difference in voltages across the temperature dependent resistors 5 and 6. B designates a comparator circuit comprising dividing resistors $R_7$ and $R_8$ and an operational amplifier $OP_2$, which compares an output of the differential amplifier A with a reference voltage. C designates a Miller integrator circuit comprising input resistors $R_9$ and $R_{10}$, an operational amplifier $OP_3$ and a capacitor $C_1$, which integrates an output from the comparator circuit B. An integrated output is supplied to a bridge circuit comprising the resistors $R_1$ and $R_2$ and the temperature dependent resistors 5 and 6 through a power transistor $Tr_1$. $9m_1$ and $9m_2$ designate output terminals of the heat amount control circuit 9A. In the operational circuit 9B shown in FIG. 5, $9m_1'$ and $9m_2'$ designate input terminals to the operational circuit 9B, and connected to one of the input terminals $9m_1'$ is one of the output terminals $9m_1$ of the heat amount control circuit 9A while the other input terminal $9m_2'$ is connected with the other output terminal $9m_2$. 9a designates a conventional differential amplifier which compares a voltage V across the reference dividing resistor $R_1$ and the first temperature dependent resistor 5 in the heat amount control circuit 9A and a voltage $V_1$ across the first voltage dependent resistor $R_5$ and amplifies a difference therebetween to produce an output representing the difference, and 9b designates a conventional A-D convertor which analog-to-digital converts the output of the differential amplifier 9a. 9c designates a conventional A-D convertor which analog-to-digital converts the voltage $V_1$ across the first temperature dependent resistor 5. 9d designates a conventional multiplier circuit which calculates the amount of the intake-air from the output signals of the A-D convertors 9b and 9c. Assuming that $\Delta T$ is a temperature difference detected by the temperature dependent resistors 5 and 6, Q is an amount of heat generated by the first temperature dependent resistor 5, G is a flow rate of the intake-air by weight, $V_1$ is a voltage across the first temperature dependent resistor 5, V is a voltage across the series-connected circuit of the first temperature dependent resistor 5 and the reference dividing resistor $R_1$, R is a resistance of the reference dividing resistor $R_1$, $\phi$ is the specific heat of air at constant pressure, and I is a current through the first temperature dependent resistor 5, the Q may be expressed by;

$$Q = 0.24 \times V_1 I = 0.24 \times V_1 \times (V-V_1)/R = G\phi T$$

Hence, $$V_1(V-V_1) = \frac{G \phi \Delta T R}{0.24}$$

The resistance R is constant and the specific heat of air at constant pressure $\phi$ is also constant. Thus, by maintaining the temperature difference $\Delta T$ at a fixed value through the control by the heat amount control circuit 9A, the term $\phi \cdot \Delta T \cdot R/0.24$ can be maintained to a constant value. By substituting the term $\phi \cdot \Delta T \cdot R/0.24$ with K (a proportion constant), the above formula can be expressed as;

$$V_1(V-V_1) = KG$$

Accordingly, the flow rate of the intake-air by weight G is given by $V_1 \cdot (V-V_1)/K$. By calculating the product of $V \cdot (V-V_1)$ by the multiplier circuit 9d, the flow rate of the intake-air by weight is derived. 9e designates an oscillator, 9f an AND gate, 9h a flip-flop, 9i a conventional counter which counts pulse signals from the oscillator 9e, 9k a conventional memory latch which stores a signal from the multiplier circuit 9d in synchronism with a signal from an ignition detector 10. 9j designates a conventional comparator which compares the stored signal of the memory latch 9k with an output signal of the counter 9i, and produces an output signal when the contents of both signals are equal.

The operation of the system of the present invention thus constructed will now be described. An amount of air the magnitude of which is determined by the degree of aperture of the throttle valve 2 is taken into the internal combustion engine 3 through the intake pipe 1. During the course, the intake-air is uniformly heated both around the pipe wall and at the center of the pipe 1 by the temperature dependent resistor 5 which comprises the platinum resistor wire spread in a grid pattern across the cross section of the pipe. Since the intake pipe 1 is provided with the heat insulating layer 13 it may be considered that all of the heat generated by the temperature dependent resistor 5 contributes to heat the intake-air. As a result, the temperature difference $\Delta T$ which depends on the heat generated by the first temperature dependent resistor 5 and on the amount of the intake-air is produced between the temperature dependent resistors 5 and 6. This temperature difference $\Delta T$ is detected by the temperature dependent resistors 5 and 6, and a voltage across the bridge circuit, and hence the amount of heat generated by the temperature dependent resistor 5 is controlled depending on the temperature difference $\Delta T$ by the heat amount control circuit 9A. For example, as the amount of the intake-air increases, the temperature rise of the intake-air due to the heat of the temperature dependent resistor 5 decreases resulting in the decrease of the temperature difference $\Delta T$. As a result, a potential difference between a junction point b of the resistor $R_2$ and the temperature dependent resistor 6 in the bridge circuit and a junction point a of the resistor $R_1$ and the temperature dependent resistor 5 decreases, the output voltage of the differential amplifier circuit A decreases below a preset voltage which is determined by the dividing resistors $R_7$ and $R_8$ of the comparator circuit B. This causes the output of the comparator circuit B to be negative and the output voltage of the Miller integrator circuit C increases and the voltage applied to the bridge circuit and hence to the temperature dependent resistor 5 through the power transistor $Tr_1$ rises, resulting in the increase of the heat amount and the temperature difference $\Delta T$. Conversely, as the amount of the intake-air decreases, the temperature difference $\Delta T$ increases. As a result, the potential difference between the junction points a and b in the bridge circuit increases, the output of the differential amplifier circuit A increases above the preset voltage of the comparator circuit B. This causes the output of the comparator circuit B to be positive and the output voltage of the Miller integrator circuit C decreases, the output voltage of the power transistor $Tr_1$ decreases, the amount of heat generated by the temperature dependent resistor 5 decreases, and the temperature difference $\Delta T$ decreases. In this manner, the heat amount control circuit 9A controls the voltage applied to the bridge circuit to cause the temperature dependent resistor 5 to generate heat depending on the amount of the intake-air whereby the temperature difference $\Delta T$ between the temperature dependent resistors 5 and 6 is always maintained at a constant value.

The operation of the operational circuit 9B is explained below. During the idling rotation of the internal combustion engine, the amount of the intake-air to the engine is less. As a result, the voltage V applied to the bridge circuit by the heat amount control circuit 9A, that is, the voltage V a cross the temperature dependent resistor 5 and the reference dividing resistor $R_1$, and the voltage $V_1$ across the temperature dependent resistor 5 are both small, the output (V−$V_1$) of the differential amplifier 9a is small, the output (V−$V_1$) converted to analog form by the A-D convertor 9b is small, and the output of the multiplier circuit 9d which multiplies the output (V−$V_1$) of the A-D convertor 9b and the output $V_1$ of the other A-D convertor 9c is small. On the other hand, during moderate and high revolution of the internal combustion engine 3, the amount of the intake-air increases, and the output (V−$V_1$) of the A-D convertor 9 is increased by the heat amount control circuit 9A and the output $V_1 \cdot (V-V_1)$ of the multiplier 9a increases. In this manner, the multiplier circuit 9d produces a signal the magnitude of which is proportional to the amount of intake-air. This signal is stored in the memory latch 9 is synchronism with the signal from the ignition detector 10. On the other hand, the flip-flop 9h is set by a triggering signal from the ignition detector 10 which is in synchronism with the rotation of the engine, and the output of the flip-flop is applied to the injection valve 12 through the amplifier 11 to open the injection valve 12. At the same time the output of the flip-flop 9h cause the AND gate 9f to open so that the clock pulses from the oscillator 9e are counted by the counter 9i. When the content of the signal stored in the memory latch 9k becomes equal to the content of the output of the counter 9i, the comparator circuit 9j produces an output signal, which causes the flip-flop 9h to reset and the injection valve 12 to close and the AND gate 9f to close. When a trigger signal is subsequently sent from the ignition detector 10, the counter 9i and the memory latch 9k are reset. The above operation cycle is repeated as the internal combustion engine 3 rotates. In this manner, the duration of opening of the injection valve 12, that is, the amount of fuel injection, is determined by the output of the multiplier circuit 9d, that is, the signal which is proportional to the amount of the intake-air.

Figure 7:
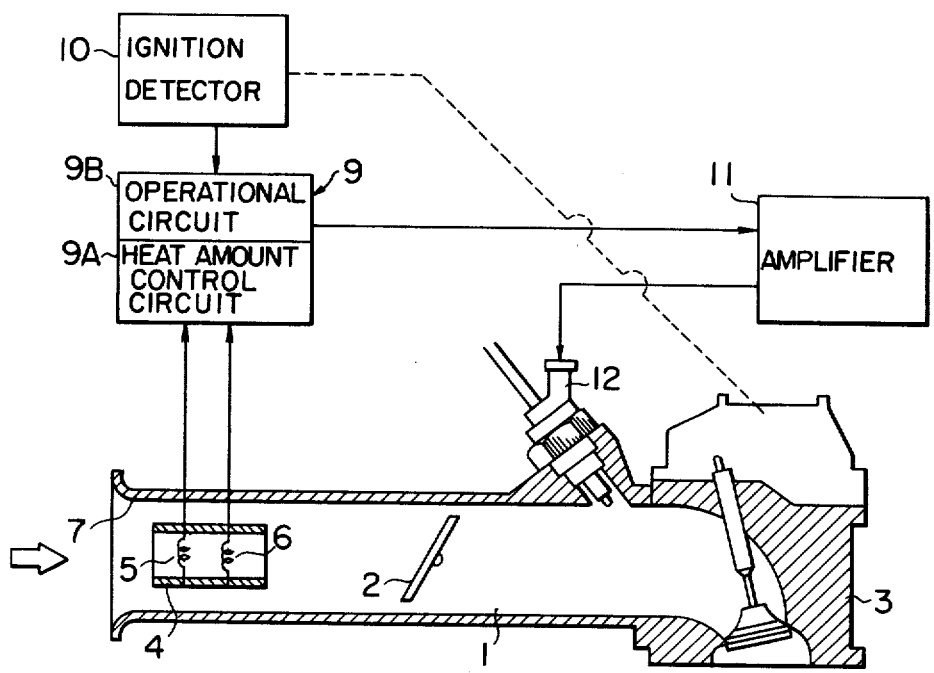
FIG. 7 shows a configuration of a second embodiment in accordance with the present invention.

Referring now to FIG. 7, a second embodiment of the present invention is described. In the present embodiment, the flow rate by weight is measured with respect to a fixed proportion of the intake-air to calculate the amount of the intake-air. To this end, a manifold 4 made of a heat insulating material such as glass wool or the like is arranged in a portion of the intake pipe 1 and first and second temperature dependent resistors 5 and 6 are arranged in the manifold 4 in a similar manner as in the previous embodiment. A baffle 7 is provided in the intake pipe 1 upstream of the manifold 4 so as to maintain the amount of air passing through the manifold 4 to a fixed proportion of the entire amount of the intake-air passing through the intake pipe 1. In the present embodiment, the baffle 7 is constructed such that the intake pipe 1 is opened in the shape of a bell mouth, and an air cleaner is provided upstream thereof. The control unit 9, ignition detector 10, amplifier 11 and injection valve 12 are similar to those used in the previous embodiment. In the present embodiment, the power supplied to the bridge circuit consisting of the temperature dependent resistors 5 and 6 and the reference dividing resistors $R_1$ and $R_2$ may be less than that required in the previous embodiment.

In the above embodiments, the first and second temperature dependent resistors 5 and 6 have the same resistance-temperature characteristic. Resistors of different resistance-temperature characteristics may be used if a resistor is connected in parallel with one of the temperature dependent resistors and the resistance value of this resistor as well as those of the reference dividing resistors $R_1$ and $R_2$ are properly selected.

Figure 8:
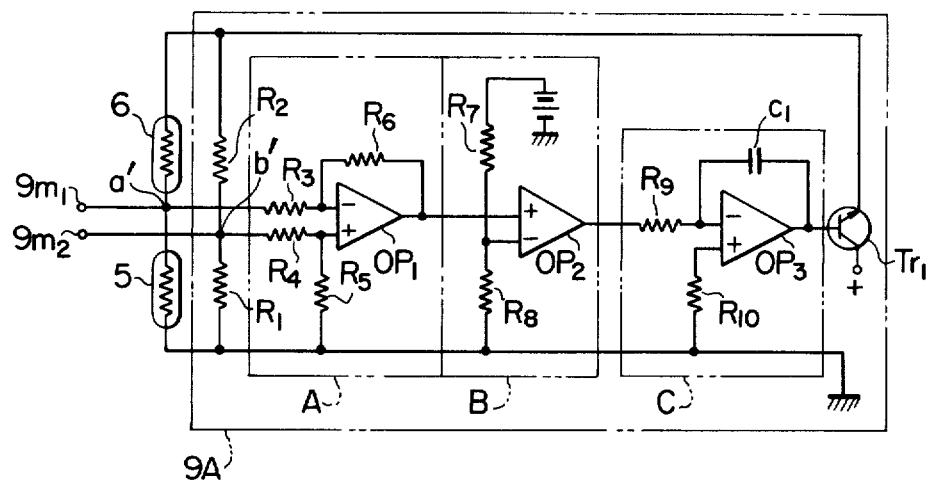
FIGS. 8 and 9 show configurations of major portions of third and fourth embodiments in accordance with the present invention, respectively.
Figure 9:
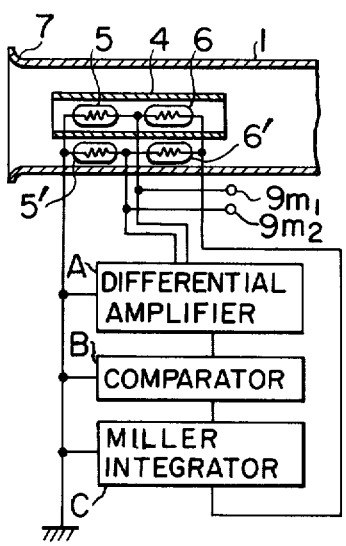

The bridge circuit consisting of the first and second temperature dependent resistors 5 and 6 and the reference dividing resistors $R_1$ and $R_2$ may be replaced by the other bridge circuit such as those illustrated in the embodiments shown in FIGS. 8 and 9. In the third embodiment shown in FIG. 8, like in the first embodiment, the first and the second temperature dependent resistors 5 and 6 have the same resistance-temperature characteristic and the dividing resistors $R_1$ and $R_2$ are also similar to those used in the first embodiment. Like in the first embodiment, the flow rate of the intake-air by weight G is determined bby calculating the amount of heat Q generated by the first temperature dependent resistor 5. The amount of heat may be determined in the following way. Assuming that $Va'$ and $Vb'$ are potentials at the junctions $a'$ and $b'$, respectively, in the bridge circuit shown in FIG. 8 and hence the voltage across the first temperature dependent resistor 5 and across the dividing resistor $R_1$, respectively, the $Rx$ is a resistance value of the first temperature dependent resistor 5, the Q can be expressed by;

$$Q = 0.24 \, Va'^2/Rx$$

Since the variation of $Rx$ with respect to the temperature is very slight compared to the variation in the amount of the intake-air to the engine, it may be approximated to a constant value. Also, $Va'$ may be approximated to $Vb'$. Therefore, $$Q = K'Va' \cdot Vb'$$

Thus, by connecting the output terminals $9m_1$ and $9m_2$ of the heat amount control circuit 9A connected to the junction points $a'$ and $b'$ to the input terminals of the multiplier circuit 9d in the operational circuit 9B, the flow rate of the intake-air by weight G can be determined.

In the fourth embodiment shown in FIG. 9, the dividing resistors $R_1$ and $R_2$ in the third embodiment shown in FIG. 8 have been replaced by two temperature dependent resistors 5' and 6' which have the same temperature-resistance characteristics as those of the temperature dependent resistors 5 and 6. In the present embodiment, the flow rate of the intake-air by weight G can be calculated in a similar manner as in the previous embodiment. It should be understood that in the present embodiment the temperature dependent resistors 5' and 6' are constructed to avoid heat transfer between each other and to and from the first and second temperature dependent resistors 5 and 6.

Figure 10:
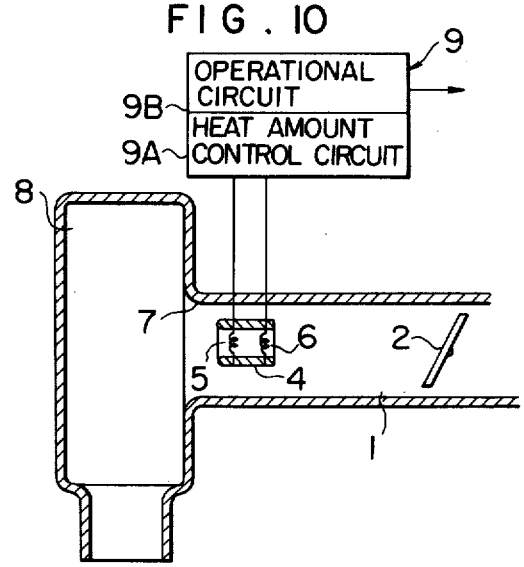
FIG. 10 shows a configuration of a fifth embodiment in accordance with the present invention.
Figure 11:
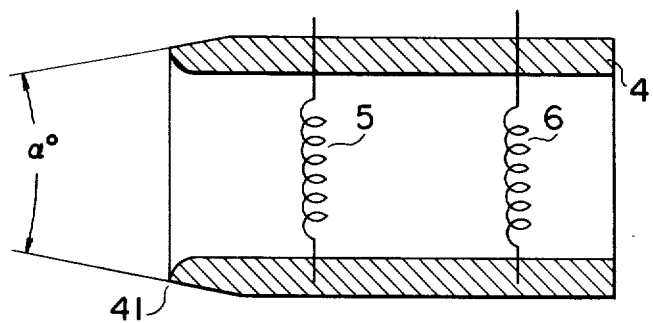
FIG. 11 is an enlarged view of a manifold shown in FIG. 10.

FIGS. 10 and 11 illustrate a fifth embodiment of the present invention. It differs from the second embodiment shown in FIG. 7 in that a disturbance-proof container 8 is provided to prevent the flow rate distribution of the intake-air to the intake pipe 1 from being disturbed by the influence of the external atmosphere. The container 8 may be a part of an air cleaner. A manifold 4 has its inner side of an entrance portion formed in a bell-mouthed shape and a baffle 41 is formed at an outer side of the entrance portion, which has an inclination angle $\alpha$ of not more than 20 degrees as shown in FIG. 11. In this embodiment, the amount of air passing through the manifold 4 with respect to the amount of air passing through the intake pipe 1 is always maintained at a fixed ratio.

Figure 12:
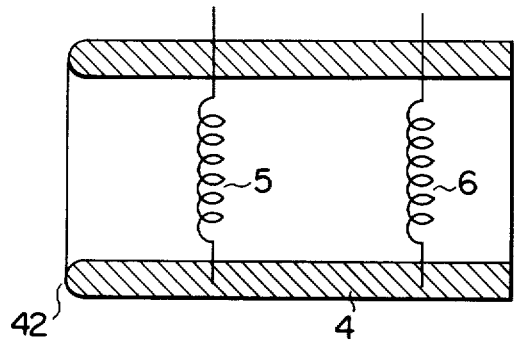
FIG. 12 is an enlarged view of a manifold of a sixth embodiment in accordance with the present invention.

FIG. 12 illustrates a sixth embodiment of the present invention. While the fifth embodiment included the manifold 4 having the inclined baffle 41 formed on the outer side of the entrance portion, the present embodiment is formed with a baffle 42 of a curved surface in cross section at a tip end of the entrance portion.

Figure 13:
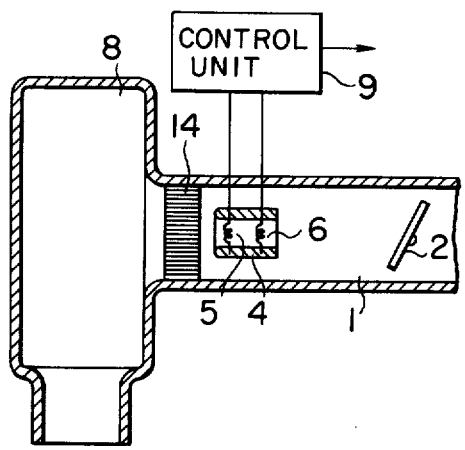
FIGS. 13 and 14 show configurations of seventh and eighth embodiments in accordance with the present invention.

FIG. 13 shows a seventh embodiment of the present invention. In addition to the structure of the fifth embodiment, the present embodiment is provided with a baffle grid 14 in the intake pipe upstream of the manifold 4 for improved baffling of the intake-air.

While the first temperature dependent resistor 5 serving as a temperature detector for the intake-air in the first to fourth embodiments also functions as an electric heater for generating heat, it brings about the following inconvenience. Although it is advantageous that the voltage change between the upstream and downstream temperature dependent resistors is larger for the ease of control and the accuracy of measurement, it is necessary to use a material of high resistance as a temperature dependent resistor material because the material having a low resistance generally exhibits a small temperature-resistance variation. When a temperature dependent resistor material having a high resistance is used to obtain a larger voltage variation, a voltage applied across the temperature dependent resistor must be increased. However, when the system is to be mounted on an automobile for use as an intake-air detecting system for the internal combustion engine, the power supply available is limited and it is impossible to use a high voltage to be applied across the resistor.

Figure 14:
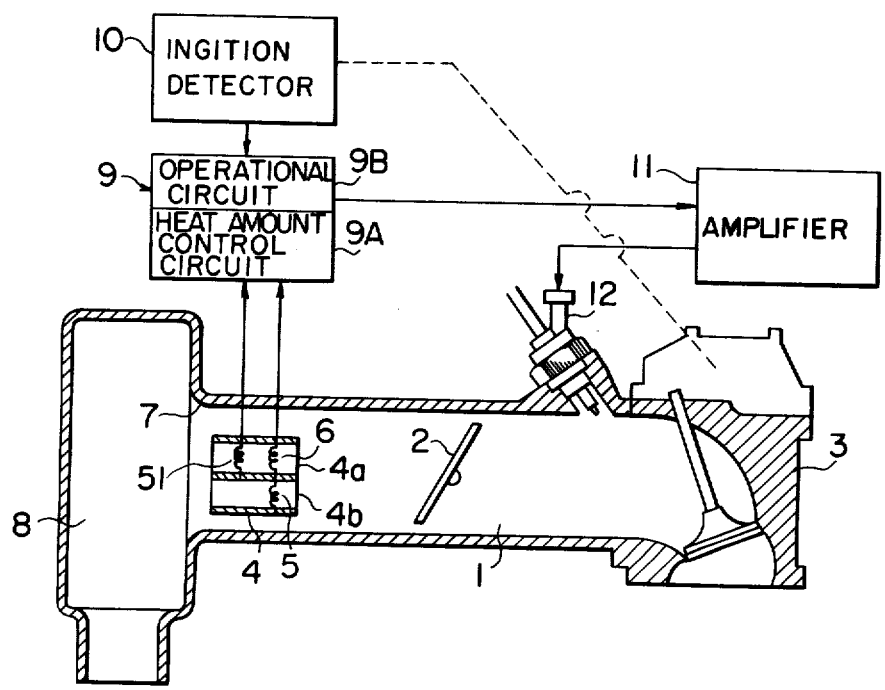
Figure 15:
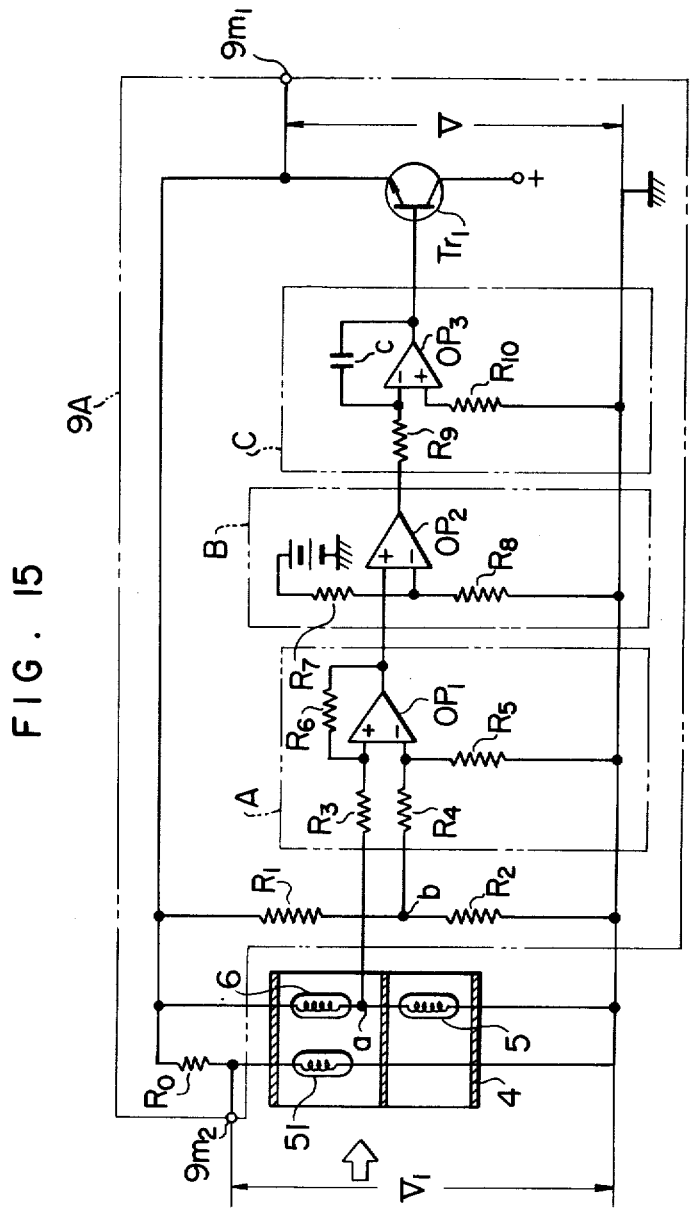
FIG. 15 shows an electrical circuit diagram of a heat amount control circuit shown in FIG. 14.

In this regard, in an eighth embodiment shown in FIGS. 14 and 15, an electrical heater 51 is provided as a heat source in addition to the first temperature dependent resistor 5.

Referring to FIG. 14, 1 designates an intake pipe for the internal combustion engine 3, 2 designates a throttle valve mounted on the intake pipe 1, 4 designates a manifold mounted in the intake pipe 1, which has two paths 4a and 4b and is made of heat insulating material such as glass wool or the like. 5 designates a first temperature dependent resistor which is mounted in one of the paths 4b in the manifold 4 and serves as a thermometer, 6 designates a second temperature dependent resistor mounted in the other path 4a in the manifold and serves as a thermometer. Both temperature dependent resistors 5 and 6 have the same resistance-temperature characteristic. In the present embodiment, the temperature dependent resistors comprise platinum resistor wires of positive temperature-resistance coefficient, which are similar to that used in the first embodiment. 51 designates an electrical heater arranged upstream of and adjacent to the temperature dependent resistor 6 which, in the present embodiment, consists of a platinum resistor wire. 7 designates a baffle constructed in a bell-mouthed shape to baffle the flow of the intake-air to the intake pipe 1. 8 designates an anti-disturbance container which prevents the intake-air passing through the baffle 7 from being disturbed by the influence of the external atmosphere. 9 designates a control unit which comprises a heat amount control circuit 9A for controlling the heat generated by the electrical heater 51 so as to maintain a fixed difference between the temperatures of the temperature dependent resistors 5 and 6 and hence between the resistances of both resistors, and an operational circuit 9B which calculates the amount of heat generated by the electrical heater 51 for controlling the duration of opening of an injection valve 12 which injects fuel to the engine 3. 10 designates a conventional ignition detector which produces pulse outputs which are in synchronism with the rotation of the engine 3, and 11 designates an amplifier which amplifies an output signal from the control unit. 12 designates an electromagnetic injection valve which is opened in response to a signal from the amplifier 11 to supply fuel to the engine 3. The heat amount control circuit 9A shown in FIG. 15 comprises a differential amplifier in which currents flow through the reference dividing resistors $R_1$ and $R_2$, the temperature dependent resistors 5 and 6, the electrical heater 51 and the reference dividing resistor $R_0$. A designates a differential amplifier comprising input resistors $R_3$ and $R_4$, a resistor $R_5$, a feedback resistor $R_6$ and an operational amplifier $OP_1$, which amplifies the voltage difference between the temperature dependent resistors 5 and 6. B designates a comparator circuit which comprises dividing resistors $R_7$ and $R_8$ and an operational amplifier $OP_2$ and which compares an output of the differential amplifier A with a reference voltage. C designates a Miller integrator circuit which comprises input resistors $R_9$ and $R_{10}$, an operational amplifier $OP_3$ and a capacitor $C_1$ and which integrates an output of the comparator circuit B, and the integrated output is supplied through a power transistor $Tr_1$ to a bridge circuit comprising the resistors $R_1$ and $R_2$ and the temperature dependent resistors 5 and 6, and to the electrical heater 51 connected in parallel with the bridge circuit. $9m_1$ and $9m_2$ designate output terminals of the heat amount control circuit 9A, which are respectively connected to input terminals $9m_1'$ and $9m_2'$ of an operational circuit 9B which is identical to that shown in the first embodiment of FIG. 5.

In the operational circuit 9B, the flow rate of the intake-air by weight G can be determined by calculating the amount of heat generated by the electrical heater 51. Assuming that $\Delta T$ is a temperature difference detected by the temperature dependent resistors 5 and 6, Q is an amount of heat generated by the electrical heater, G is a flow rate of the intake-air by weight, $V_1$ is a voltage across the electrical heater 51, V is a voltage across the series-connected circuit of the electrical heater 51 and the reference dividing resistor $R_0$, R is a resistance of the reference dividing resistor $R_0$, $\phi$ is the specific heat of air at constant pressure, and I is a magnitude of the current flowing through the electrical heater 51, the Q can be expressed by:

$$Q = 0.24 \times V_1 I = 0.24 V_1 \times (V-V_1)/R = G \cdot \phi \cdot \Delta T$$

Thus, $$V_1(V-V_1) = G \cdot \phi \cdot \Delta T \cdot R/0.24$$

The resistance R is constant and the specific heat of air at constant pressure $\phi$ is also substantially constant. Thus, by controlling the temperature difference $\Delta T$ by the heat amount control circuit 9A so as to maintain it at a fixed value, the term $\phi \cdot \Delta T \cdot R/0.24$ becomes constant. Therefore, by substituting the term $\phi \cdot \Delta T \cdot T \times R/0.24$ with K (a proportion constant) the above formula can be expressed as:

$$V_1(V-V_1) = K \cdot G$$

Accordingly, the flow rate of the intake-air by weight G can be determined by;

$$G = V_1(V-V_1)/K$$

The operation of the present embodiment thus constructed will now be described. An amount of air the magnitude of which is determined by the degree of opening of the throttle valve 2 is taken into the internal combustion engine 3 from the anti-disturbance container 8 through the intake pipe 1. Since the air taken into the intake pipe 1 is baffled by the baffle 7 a fixed proportion of the entire intake-air always passes through the manifold 4 having two paths. In one path of the manifold 4, due to the heat generated by the electrical heater 51, the intake-air passing through the one path flows past the temperature dependent resistor 6 with a temperature rise $\Delta T$ and then taken into the internal combustion engine 3. In the other path, the intake-air flows past the temperature dependent resistor 5 and taken into the internal combustion engine 3. As a result, the temperature difference $\Delta T$ which is related to the amount of the intake-air and which is caused by the heat generated by the electrical heater 51 is produced as a voltage change between the temperature dependent resistors 5 and 6. The voltage applied across the bridge circuit and hence the amount of heat generated by the electrical heater 51 is controlled by the heat amount control circuit 9A in such a manner that the temperature difference $\Delta T$ and hence the voltage change developed between the temperature dependent resistors 5 and 6 are maintained at a constant value. For example, as the amount of the intake-air increases, the temperature rise of the intake-air due to the heat generated by the electrical heater 51 decreases, the temperature difference $\Delta T$ decreases, and the potential difference between the junction point $a$ of the temperature dependent resistors 5 and 6 in the bridge circuit and the junction point $b$ of the resistors $R_1$ and $R_2$ decreases, the output voltage of the differential amplifier circuit A decreases below the preset voltage determined by the dividing resistors $R_7$ and $R_8$ of the comparator circuit B, the output of the comparator circuit B becomes negative, the output of the Miller integrator circuit C increases, the voltage applied through the power transistor $Tr_1$ to the bridge circuit and hence to the electrical heater 51 increases, and the temperature difference $\Delta T$ increases. Conversely, as the amount of the intake-air decreases, the temperature difference $\Delta T$ tends to increase. As a result, the potential difference between the junction points $a$ and $b$ in the bridge circuit increases, the output of the differential amplifier circuit A increases above the preset voltage of the comparator circuit B, the output of the comparator circuit B becomes positive, the output of the Miller integrator circuit C decreases, the output of the power transistor $Tr_1$ decreases, the amount of heat generated by the electrical heater 51 decreases, and the temperature difference $\Delta T$ decreases. In this manner, the heat amount control circuit 9A controls the voltage applied to the bridge circuit and hence to the electrical heater 51 to heat the electrical heater 51 depending on the amount of the intake-air in order to maintain a constant temperature difference $\Delta T$ between the temperature dependent resistors 5 and 6.

Figure 16:
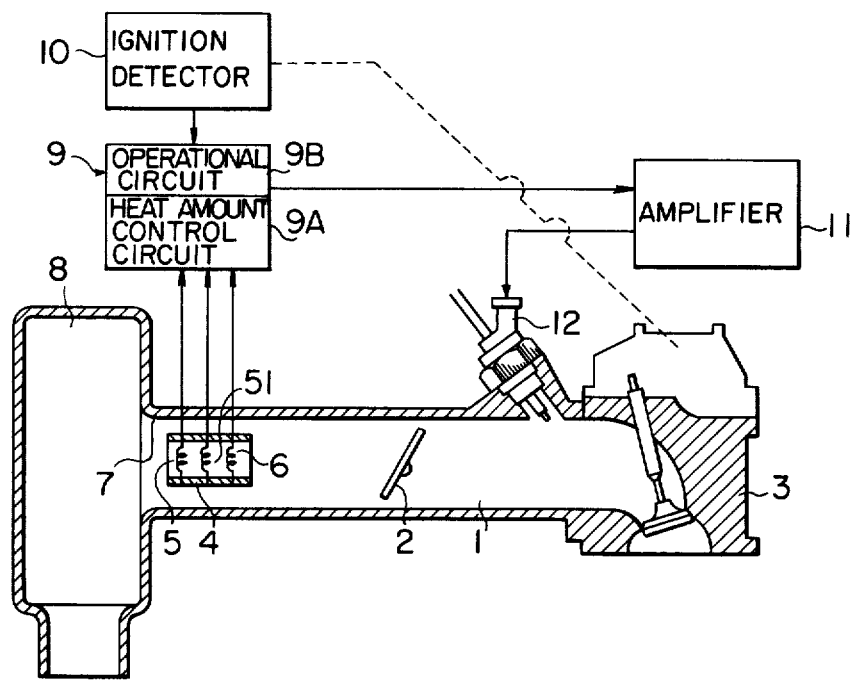
FIG. 16 is a modification of the eighth embodiment shown in FIG. 14.

FIG. 16 shows a modification of the eighth embodiment shown in FIG. 14. This modification is similar to the eighth embodiment except that the manifold 4 includes a single path and the first temperature dependent resistor 5 is arranged in the path upstream thereof while the second temperature dependent resistor 6 is arranged downstream thereof, and the electrical heater 51 is arranged between the temperature dependent resistors 5 and 6. The connection of the resistors is similar to that in the eighth embodiment. With this arrangement, it is possible to use the temperature dependent resistors 5 and 6 of large resistance value and hence a large temperature-resistance variation in order to enable accurate detection and control of the temperature difference $\Delta T$. In addition, the influence of the heat generated by the temperature dependent resistors 5 and 6 per se to the control of the amount of the heat generated by the electrical heater 51 can be minimized, allowing an extremely accurate measurement of the amount of the intake-air. In this case, however, the temperature dependent resistors 5 and 6 detect temperature difference $\Delta T$ due to the heat generated by the electrical heater 51 as well as the heat generated by the upstream temperature dependent resistor 5 to maintain the temperature difference $\Delta T$ to a constant value. Therefore, the operational circuit 9B calculates the amount of intake-air from the total amount of heat generated by the electrical heater 51 and the upstream, first temperature dependent resistor 5 so as to provide an equivalent operation as the eighth embodiment shown in FIG. 14.

In the eighth embodiment shown in FIG. 14, the temperature difference is detected by the voltage change caused by the resistance difference between the temperature dependent resistors 5 and 6 for directly measuring the amount of the intake-air, in the form of a flow rate by weight, which passes through the intake pipe 1. In this case, however, the intake-air taken into the engine always includes back-flow which is caused by the collision of the intake-air against the intake valve of the engine when it is closed or by the outgoing of the intake-air taken into the piston of the engine from the intake valve. The larger is the degree of opening of the throttle valve, the more strongly does the back-flow appear. Since the back-flown intake-air has been considerably heated by the heat generated by the engine, the temperature thereof is much higher than the temperature of the intake-air (atmospheric temperature). In addition to the temperature rise caused by the back-flow, the amount of the air actually taken into the engine is somewhat different than the amount of air taken from the intake pipe because of the back-flow, or because a part of the air taken from the intake pipe flows backward. As a result, where the back-flow exists an error may be included in the measured value or the measurement is rendered impossible by the influence of the elevated temperature of the back-flow air. Furthermore, the measurement may indicate different values than the actual value due to the back-flow.

Figure 17:
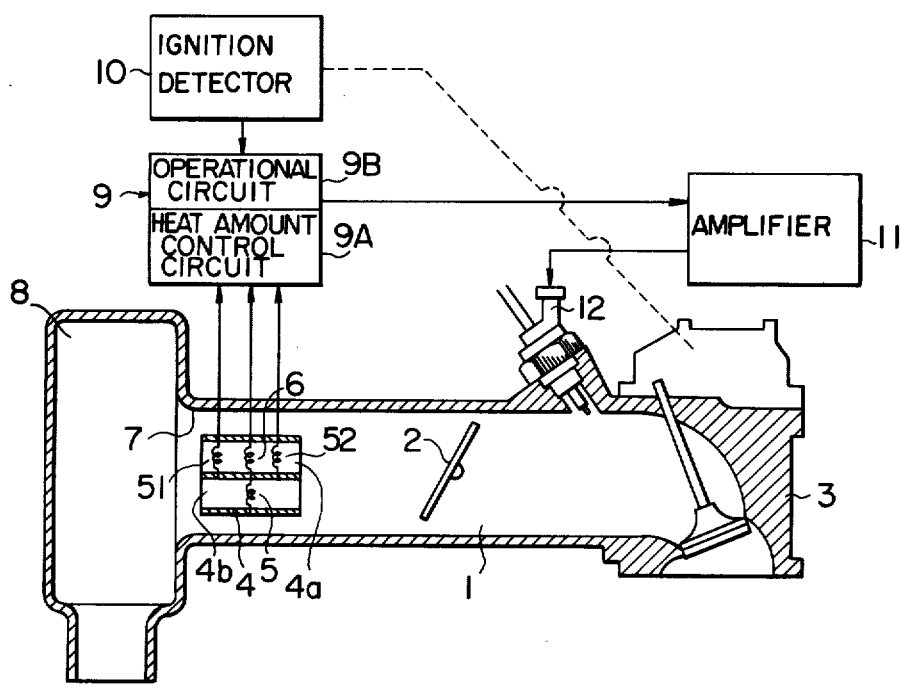
FIG. 17 shows a configuration of a ninth embodiment in accordance with the present invention.
Figure 18:
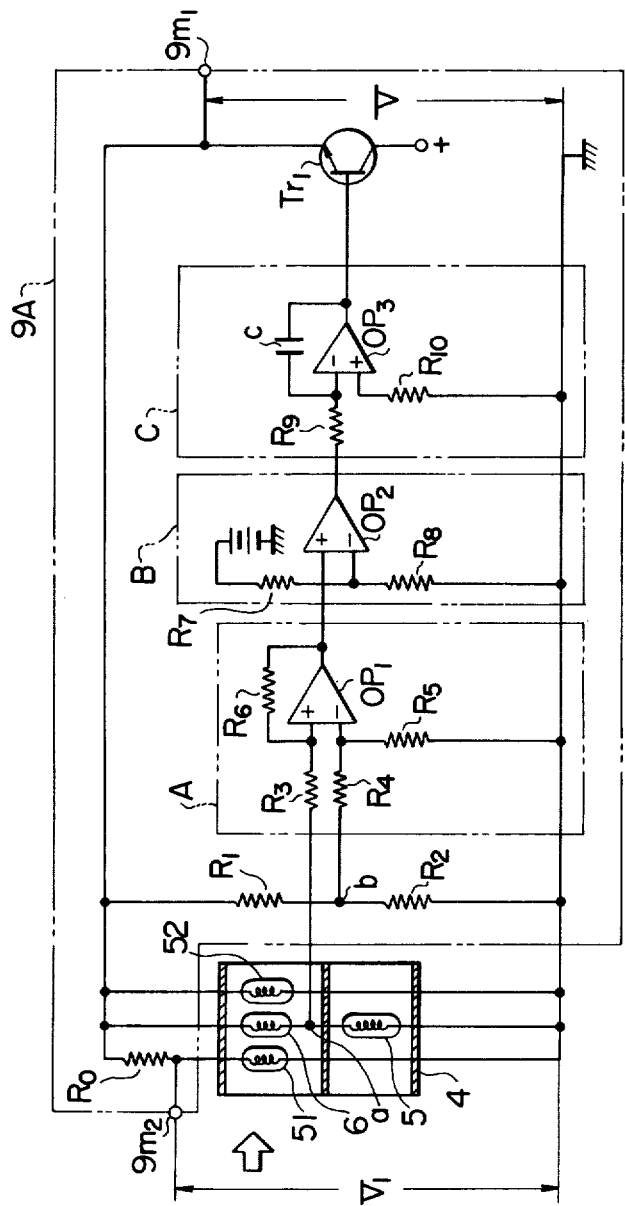
FIG. 18 is an electrical circuit diagram of a heat amount control circuit shown in FIG. 17.

In this regard, in a ninth embodiment of the present invention illustrated in FIGS. 17 and 18, in addition to the construction of the eighth embodiment shown in FIG. 14, a second electrical heater 52 is provided downstream of and adjacent to the second temperature dependent resistor 6.

With this arrangement, the error in the measurement caused by the influence of the elevated temperature of the back-flow air in the intake pipe 1 is cancelled out by the fact that both of the temperature dependent resistors serving as thermometers are equally influenced. In addition, the back-flow permits the escape of a portion of heat generated by the upstream electrical heater 51 to compensate for the heat corresponding to that which is not transmitted to the temperature dependent resistor 6 by means of the heat generated by the downstream electrical heater 52 for cancelling the error in the measurement caused by the back-flow. Thus, a more accurate measurement of the amount of intake-air can be attained. In the present embodiment, the electrical heaters 51 and 52 are of the same characteristic and the temperature dependent resistors 5 and 6 are similar to those used in the eighth embodiment and connected as shown in FIG. 18. The operational circuit 9B is similar to that used in the first embodiment.

In the eighth embodiment shown in FIG. 14, it is possible to control the air-to-fuel ratio of the gas mixture to a fixed value by detecting the flow rate of the intake-air by weight into the engine. However, when the gas mixture of a large air-to-fuel ratio, that is, thin gas mixture is to be supplied to the engine with the intention of the reduction of noxious component in the exhaust gas from the engine 3 and the reduction of the fuel consumption rate, a problem of an underpower condition may occur when an automobile incorporating such an engine is to be rapidly accelerated.

Generally, the above problem can be avoided by selecting a small air-to-fuel ratio, that is, denser gas mixture during the rapid acceleration. To this end, in the prior system such as carburetor and electronic fuel injection system, the rapid acceleration is detected by the signal from the intake-air negative pressure or the degree of opening of the throttle valve for reducing the air-to-fuel ratio during the rapid acceleration. However, the addition of means to detect the rapid acceleration leads to the complexity of the system and the increase of cost. As described in connection with the ninth embodiment, the intake-air taken into the engine 3 always includes the back-flow which is caused by the collision of intake-air against the intake valve of the engine 3 when it is closed or by the reverse flow of intake-air taken into the piston from the intake valve while the intake valve is open. This back-flow appears more strongly as the degree of opening of the throttle valve increases, that is, when higher power is required such as during the rapid acceleration. Where such back-flow exists, the heat generated by the electric heater 51 arranged upstream of the second temperature dependent resistor 6 provided in one of the paths 4a of the manifold 4 shown in the eighth embodiment of FIG. 14, is not fully transmitted to the downstream, second temperature dependent resistor 6 but escapes by the amount which is proportional to the amount of the back-flow.

Figure 19:
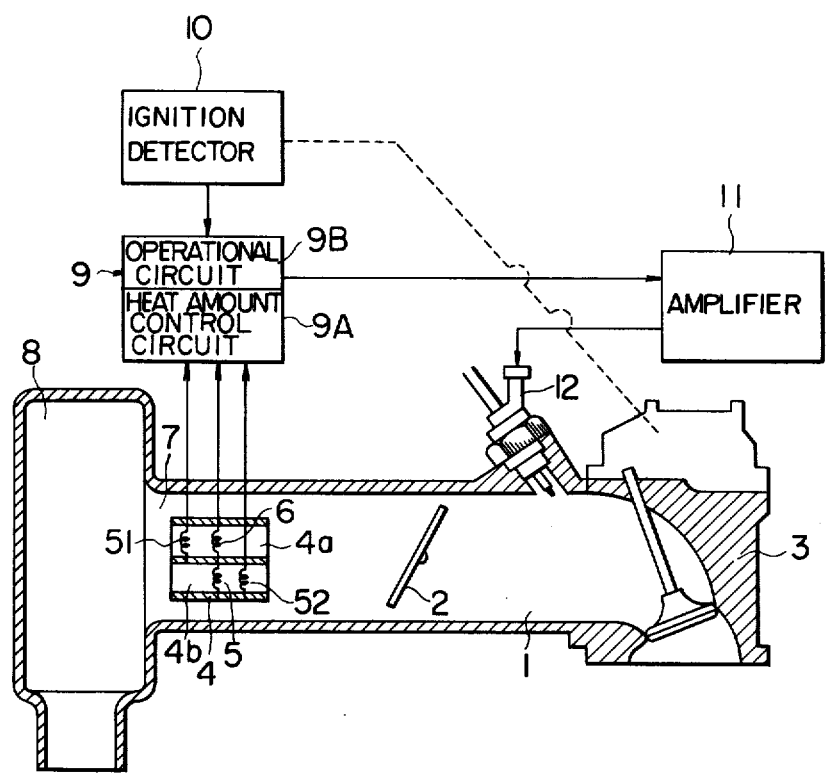
FIG. 19 shows a configuration of a tenth embodiment in accordance with the present invention.
Figure 20:
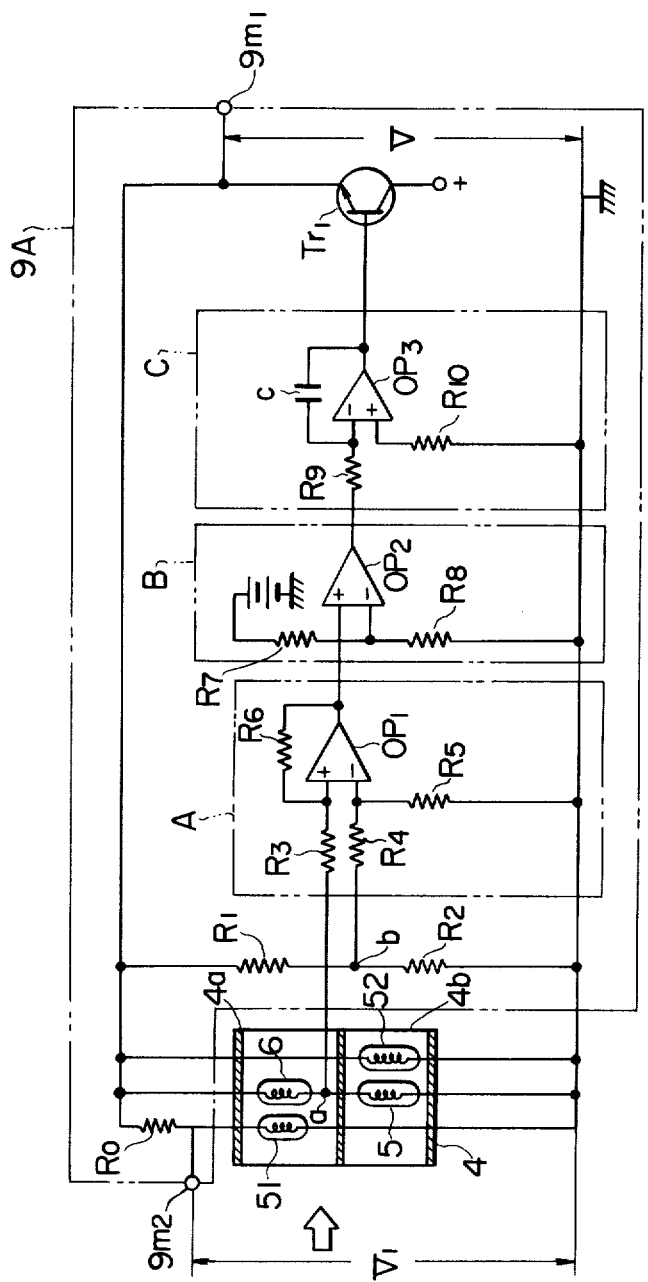
FIG. 20 is an electrical circuit diagram of a heat amount control circuit shown in FIG. 19.

In this regard, in a tenth embodiment of the present invention shown in FIGS. 19 and 20, the back-flow in the intake pipe occurring during rapid acceleration is effectively utilized, and a second electrical heater 52 is arranged immediately downstream of the first temperature dependent resistor 5 located in that path 4b of the manifold 4 in which the electrical heater 51 is not arranged. With this arrangement, when the back-flow occurs at the rapid acceleration of the engine, the heat generated by the first heater 51 is not fully transmitted to the second temperature dependent resistor 6 but escapes by the amount depending on the influence of the back-flow while the heat generated by the second heater 52 is transmitted to the first temperature dependent resistor 5 by the amount dependent on the influence by the back-flow. As a result, the temperature difference between the temperature dependent resistors 5 and 6 is rendered smaller than the temperature difference corresponding to actual amount of the intake-air, and the bridge circuit increases the voltage to be applied to the first electrical heater such that the temperature difference is maintained at a constant value. In this manner, a signal representing the amount of the intake-air which is larger than the signal corresponding to the actual amount of the intake-air is produced, which permits the reduction of the air-to-fuel ratio and an increase of the fuel amount during rapid acceleration. In this manner, by the addition of a simple construction, that is, the arrangement of the second electrical heater 52 downstream of the first temperature dependent resistor 5, the increase of the fuel amount during rapid acceleration is attained, permitting sufficient power output of the engine during acceleration and satisfactory operational performance of the engine. In the present embodiment, the electrical heaters 51 and 52 are of the same characteristic, and the temperature dependent resistors 5 and 6 are similar to those used in the eighth embodiment and connected as shown in FIG. 20. The operational circuit 9B is similar to that used in the first embodiment.

What is claimed is:

1. An intake-air amount detecting system for an internal combustion engine comprising;

a first temperature detecting means arranged in an air-intake path of an internal combustion engine for detecting the temperature of the intake-air to said engine;

an electrical heating means arranged in said intake path for heating said intake-air;

a second temperature detecting means arranged in said intake path for detecting the temperature of the intake-air having been heated by said electrical heating means;

tubular path means including a heat insulating material arranged to cover said first and second temperature detecting means and said electrical heating means;

a heat amount control means connected to said first and second temperature detecting means and said electrical heating means for controlling the amount of heat generated by said electrical heating means so as to continuously maintain a constant difference between the temperature of the heated intake-air and the non-heated intake-air; and an operational circuit means for calculating the amount of heat generated by said electrical heating means to determine the amount of intake-air to said engine.

2. An intake-air amount detecting system according to claim 1, which further comprises rectifying means for rectifying flow of the intake-air upstream of said tubular path means in said air-intake path.

3. An intake-air amount detecting system according to claim 2 wherein said rectifying means comprises a baffle grid.

4. An intake-air amount detecting system for an internal combustion engine comprising;

a baffle of bell-mouthed shape arranged upstream of an intake pipe of an internal combustion engine for baffling the flow of intake-air;

a first temperature dependent resistor arranged in said intake pipe for detecting the temperature of said intake-air to said engine;

an electrical heater arranged in said intake pipe for heating said intake-air;

a second temperature dependent resistor arranged in said intake pipe for detecting the temperature of the intake-air having been heated by said electrical heater;

a manifold including a heat insulating material arranged to cover said first temperature dependent resistor, said electrical heater and said second temperature dependent resistor, said manifold having its upstream end so constructed that a fixed proportion of the intake-air passing through said intake pipe always flows into said manifold;

reference dividing resistors cooperating with said first and second temperature dependent resistors to constitute respective arms of a bridge circuit;

a heat amount control circuit connected to said bridge circuit and said electrical heater for controlling the amount of heat generated by said electrical heater such that a temperature difference between the temperatures detected by said first and second temperature dependent resistors is continuously maintained at a predetermined value; and an operational circuit for calculating the amount of heat generated by said electrical heater to determine the amount of the intake-air to the engine.

5. An intake-air amount detecting system for an internal combustion engine according to claim 4 wherein said manifold includes two air paths, in one of which are arranged said electrical heater and said second temperature dependent resistor downstream of and adjacent to said electrical heater, and in the other path said first temperature dependent resistor is arranged.

6. An intake-air amount detecting system for an internal combustion engine according to claim 5 wherein a second electrical heater is connected, at the output of said heat amount control circuit, in parallel with said electrical heater, said second electrical heater being arranged downstream of and adjacent to said second temperature dependent resistor in said one path of said manifold.

7. An intake-air amount detecting system for an internal combustion engine according to claim 5 wherein a second electrical heater is connected, at the output of said heat amount control circuit, in parallel with said first electrical heater, said second electrical heater being arranged downstream of and adjacent to said first temperature dependent resistor in said other path of said manifold.

8. An intake-air amount detecting system for an internal combustion engine according to claim 4 wherein said heat amount control circuit includes:
- a differential amplifier circuit connected to two nodes of said bridge circuit for amplifying a potential difference between said nodes;
- a comparator circuit connected to said differential amplifier for comparing an output of said differential amplifier with a reference voltage;
- a Miller integrator circuit connected to said comparator circuit for integrating an output of said comparator circuit; and
- an output circuit connected to said Miller integrator circuit for amplifying an output of said Miller integrator circuit to apply the amplified voltage to said electrical heater.

* * * * *